United States Patent [19]

Cote

[11] Patent Number: 5,123,589
[45] Date of Patent: Jun. 23, 1992

[54] REUSABLE RIGID FILM PACK

[75] Inventor: Raymond A. Cote, Taylorsville, N.C.

[73] Assignee: Waldorf Corporation, St. Paul, Minn.

[21] Appl. No.: 679,737

[22] Filed: Apr. 3, 1991

[51] Int. Cl.$^5$ .............................................. B65D 65/26
[52] U.S. Cl. .................................. 229/232; 229/149; 206/455
[58] Field of Search ............... 206/621, 628, 626, 610, 206/424, 455; 229/132, 155, 149, 40, 221, 229, 232

[56] References Cited

U.S. PATENT DOCUMENTS

| | | |
|---|---|---|
| 112,306 | 2/1871 | Wilcox . |
| 183,466 | 10/1876 | Pearl ................................. 229/149 |
| 329,134 | 10/1885 | Brotz .................................. 229/149 |
| 897,608 | 9/1908 | Ely . |
| 1,476,822 | 12/1923 | Kronenberger . |
| 1,869,724 | 8/1932 | Wallace . |
| 2,024,832 | 12/1935 | Myers ................................ 229/149 |
| 2,151,202 | 3/1939 | Guyer . |
| 2,326,390 | 8/1943 | Platt . |
| 2,619,226 | 11/1952 | Adams .............................. 229/149 |
| 2,760,710 | 8/1956 | Fritz . |
| 2,974,854 | 3/1961 | Moore . |
| 2,984,400 | 5/1961 | Kuchenbecker . |
| 3,035,756 | 5/1962 | Mullimix .......................... 229/40 |
| 3,261,537 | 7/1966 | Kistner ............................. 229/149 |
| 3,366,310 | 1/1968 | Simpson et al. ................. 206/626 |
| 3,368,739 | 2/1968 | Roccaforte et al. ............. 206/626 |
| 3,522,907 | 8/1970 | Utterback, Jr. ................... 206/628 |
| 3,524,580 | 8/1970 | Heyworth ......................... 206/424 |
| 3,549,082 | 12/1970 | Simpson . |
| 3,591,071 | 7/1971 | Rosenburg, Jr. . |
| 3,603,502 | 9/1971 | Howard et al. . |
| 3,664,572 | 5/1972 | Puchkoff et al. ................. 229/40 |
| 3,844,472 | 10/1974 | Mueller . |
| 3,899,126 | 8/1975 | Palmer .............................. 206/621 |
| 3,966,113 | 6/1976 | Tipton ............................... 229/40 |
| 4,232,816 | 11/1980 | Johnson et al. . |
| 4,360,106 | 11/1982 | Irvine et al. ...................... 206/621 |
| 4,836,438 | 6/1989 | Rigby . |
| 4,838,430 | 6/1989 | Beeman et al. . |
| 4,949,845 | 8/1990 | Dixon ................................ 206/621 |
| 4,967,911 | 11/1990 | Lo Duca . |

Primary Examiner—Stephen Marcus
Assistant Examiner—Christopher McDonald
Attorney, Agent, or Firm—Dorsey & Whitney

[57] ABSTRACT

In accordance with the present invention, a reclosable package for receiving and holding a stack of flat articles, such as developed photographic prints, is provided. The package comprises an open-top, generally rectangular box having a length and height substantially greater than its thickness when erected. The carton includes a top closure panel having a generally free edge. One of a pair of sealing tabs is removably attached adjacent each of the ends of the free edge of the closure panel. A generally central reclosing tab is located along the free edge between the sealing tabs. The front panel of the package has a relieved access area cut out therefrom for facilitating access to the package contents. Additionally, the front panel includes a reclosure tab slit for receiving the reclosure tab so that the carton can be lockably reclosed. The invention also encompasses a flat blank for forming into the package.

10 Claims, 4 Drawing Sheets

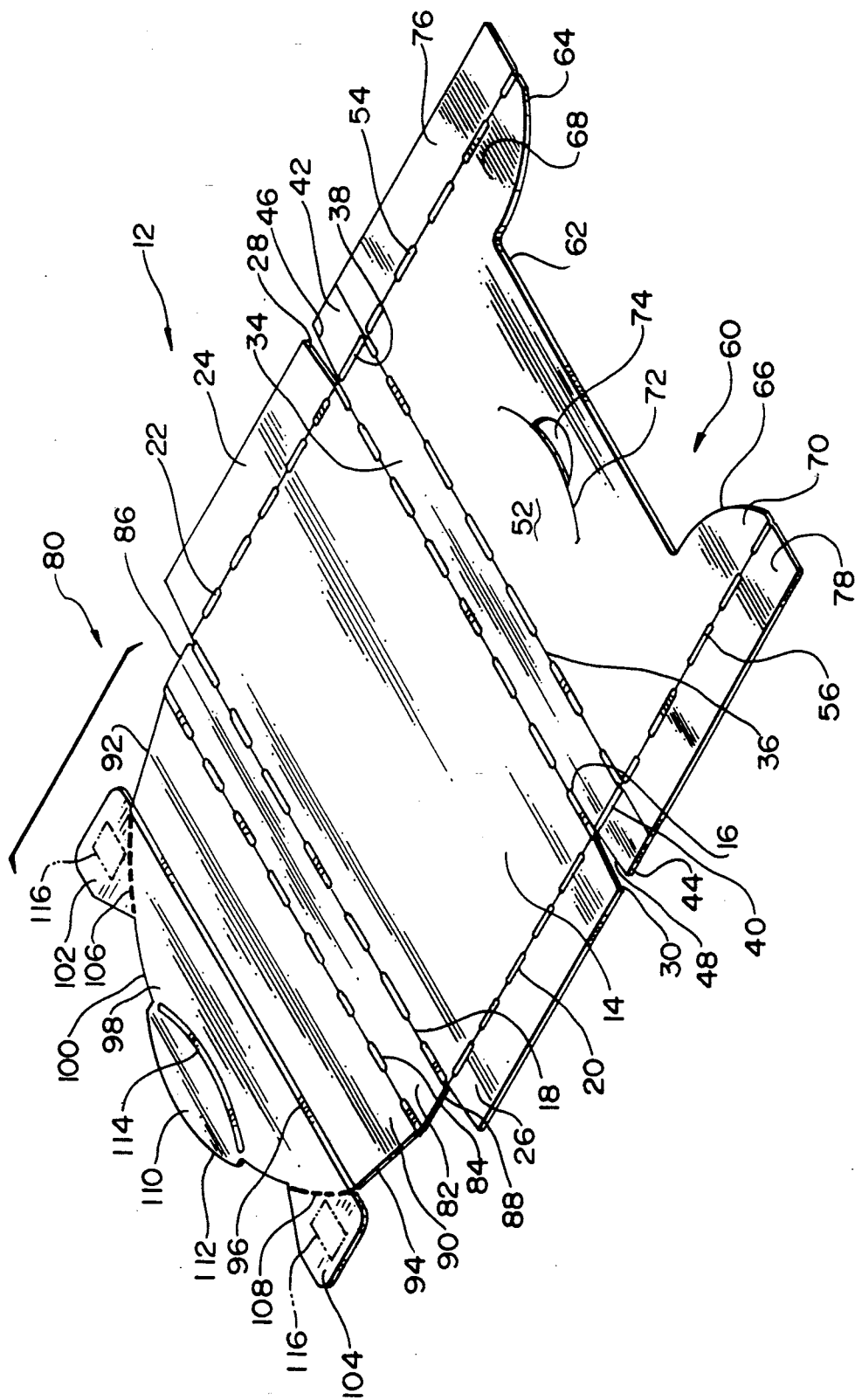

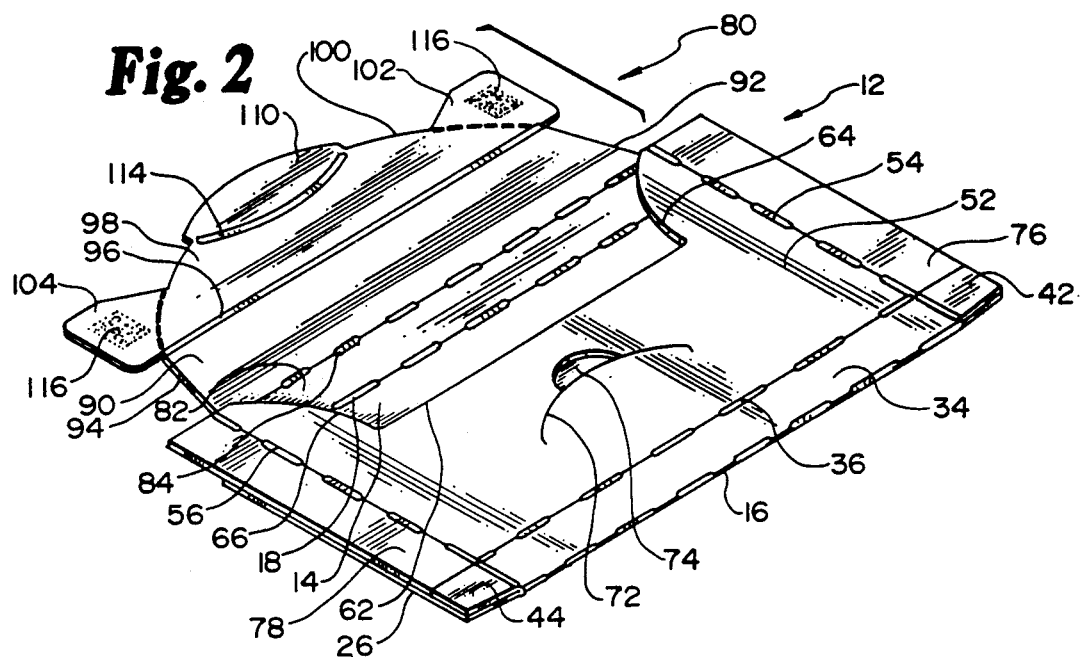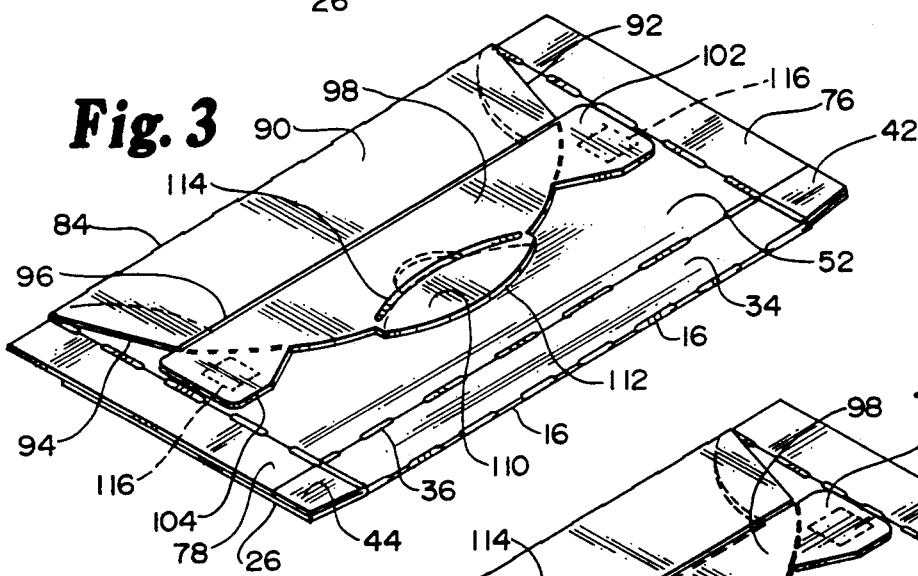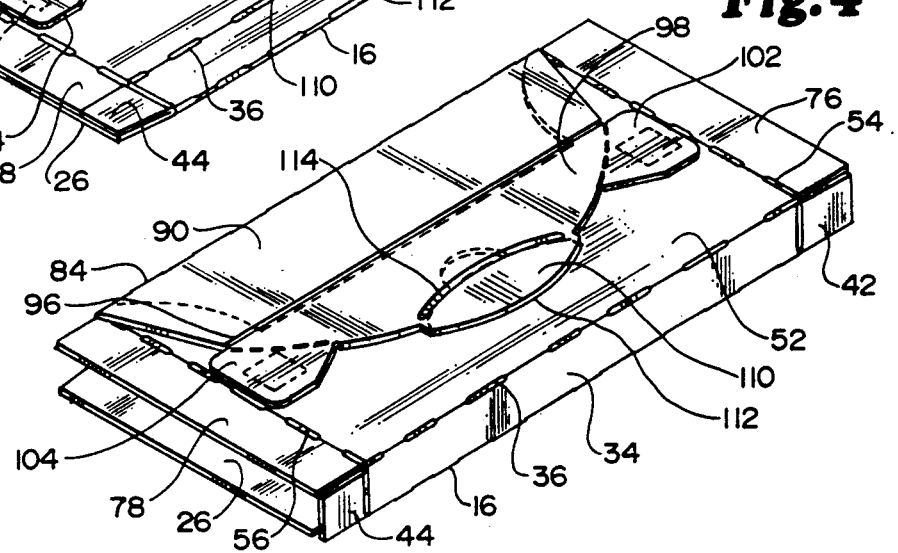

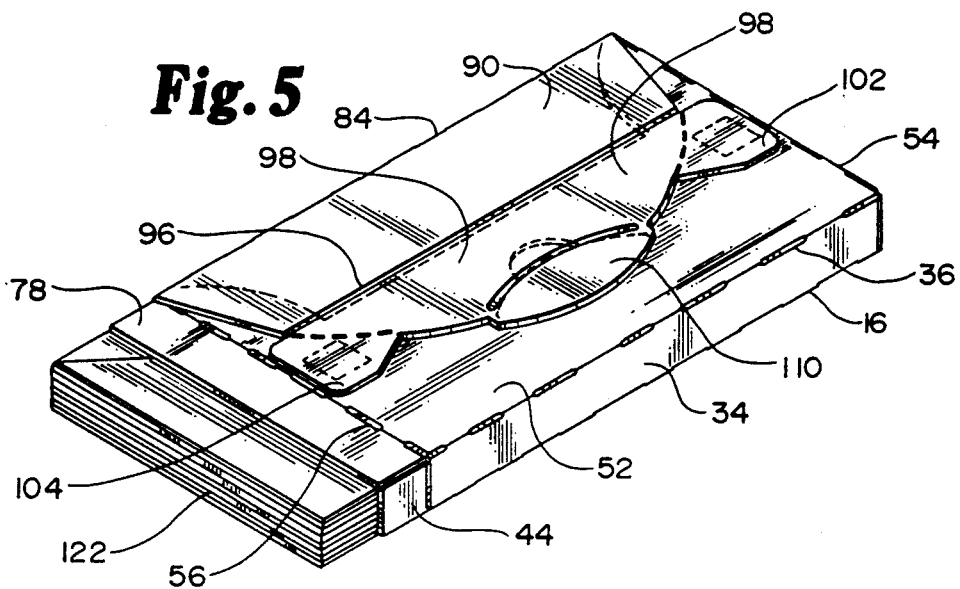
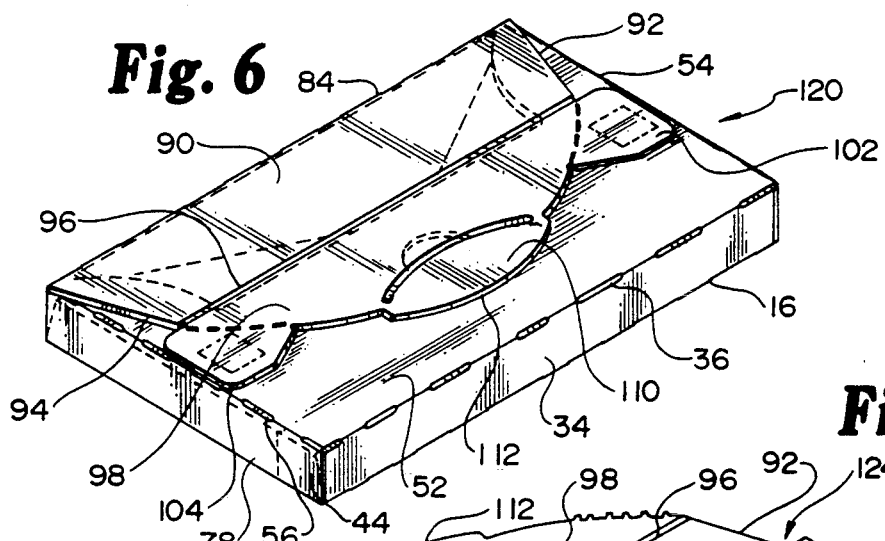
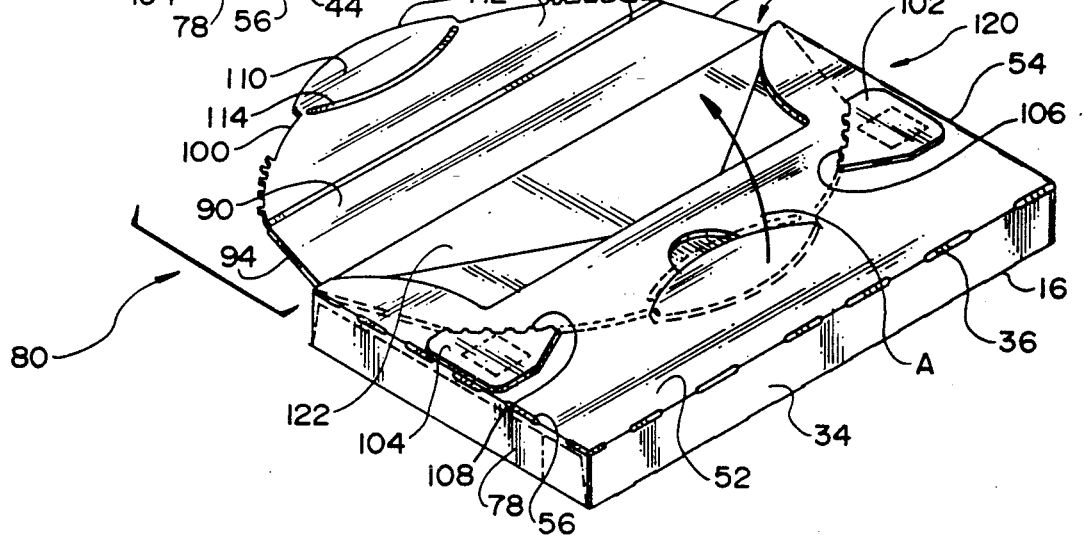

REUSABLE RIGID FILM PACK

TECHNICAL FIELD

The present invention relates to paperboard packaging. More particularly, the present invention relates to a paperboard package for containing photographic materials, including negatives or developed prints or slides, for automatic or mechanical vending of such material by consumer operated machines.

BACKGROUND OF THE INVENTION

In recent years, there has been increased interest in mechanical vending or distribution of products to consumers. The vending machine concept has been used for a long time for items such as snacks, soft drinks and tobacco products. Such vending machines offer some significant advantages, including reduced overhead and efficient use of valuable retail space. Consumer convenience and sales are enhanced by providing access to products outside of regular business hours.

Along with these and other advantages, automated or mechanical vending has generated some problems. One such problem is that the product dispensed to consumer by machine must be adequately protected during mechanical handling. A corollary problem is that when a package provides adequate protection of a mechanically vended product, a consumer may have difficulty in opening the package because of the durability features.

Although mechanical vending often results in economic gains, savings are not maximized because the packaging or cartons for products dispensed to consumers in this fashion traditionally have been single use-type packages. Such packaging is often immediately discarded and generates environmental problems because of littering and the ultimate disposal of the single use container. Additionally, such single use containers reduce the attractiveness of vending machines for retailers because of the litter that typically is generated at the location of the machine. For the consumer, the single use containers are unsuitable for the longer-term storage that may be desired and also for the repeated handling that photographic products sometimes face.

With specific regard to photographic products, particularly developed film and prints for distribution to consumers, the traditional packaging is a flimsy paper envelope-type package. Such a package is unsuited for the rigors of mechanical, robotic or other automated vending machines. Photographic materials need protection, because they are susceptible to damage by bending or scratching. Additionally, there is the possibility that portions of the envelope-type package may be torn off or misaligned, interfering with the operation of the vending machine. Finally, the dimensions and shape of an envelope-type package vary somewhat according to the items contained in the envelope, making machine handling more difficult.

Clearly, current packaging methods do not facilitate the use of automatic, mechanical vending of photographic materials to consumers to an optimum degree. Accordingly, there is an unmet need for a simple, strong, reusable paperboard package that adequately protects photographic materials during mechanical distribution to consumers.

SUMMARY OF THE INVENTION

In accordance with the present invention, a reclosable package for receiving and holding a stack of flat articles, such as developed photographic prints, is provided. The package comprises an open-top, generally rectangular box having a length and height substantially greater than its thickness when erected. The carton includes a top closure panel having a generally arcuate free edge. One of a pair of sealing tabs is removably attached adjacent each of the ends of the free edge of the closure panel. A generally central reclosing tab is located along the free edge between the sealing tabs. The front panel of the package has a relieved access area cut out therefrom for facilitating access to the package contents. Additionally, the front panel includes a reclosure tab slot for receiving the reclosure tab so that the carton can be lockably reclosed. The invention also encompasses a flat blank for forming into the package.

An objective of the present invention is to provide a reusable, relatively rigid package for use in a vending machine for the automated vending of developed photographic film to consumers.

Another object of the present invention is to provide a package for photographic material that is reusable by consumer and, after initial opening, that may be lockably reclosed for use as a storage container.

Yet another object of the present invention is to provide a reclosable, relatively rigid film pack for use in a vending machine for vending photographic materials to consumers wherein the package is sufficiently reinforced and rigid to resist damage by mechanical handling, yet includes an opening structure for facilitating access to the contents.

Still another object of the present invention is to provide a film pack that protects the contents adequately during mechanical handling, yet includes a relieved area and an opening which facilitate access to the contents.

An important advantage of the carton of the present invention is that it is durable and strong enough for repeated openings and closings, for use as a storage container, and to resist damage from mechanical handling to protect the contents during such handling.

Other advantages of the present invention are that its reusability promotes efficient use of resources. For additional protection of package contents, it can be used with suitable supplemental packaging means such as thermoplastic overwraps or other wrappings. A paperboard for forming the package may be impregnated with materials to prevent moisture damage to the contents. Although the container of the present invention is sufficiently rigid to prevent damage to fragile contents, it provides for easy access to the contents. Additionally, the package of the present invention easily may be lockably reclosed for storage of photographic prints or negatives by the consumer. The carton or package may be made available in a flat, unerected condition, partially erected or fully erected and filled and, thus, the purchaser of the package has the option of how to purchase the package.

Other objects and advantages of the present invention will become more fully apparent and understood with reference to the following specification and to the appended drawings and claims.

BRIEF DESCRIPTION OF THE DRAWINGS

FIG. 1 is a perspective view of the blank from which the film pack of the present invention may be formed and shows the die-cut profile thereof.

FIG. 2 is a perspective view of an initial step in the erection of the package.

FIG. 3 is a perspective view of a subsequent step in the erection of the package of the present invention.

FIG. 4 is a perspective view of the present invention partially erected and ready for receiving contents.

FIG. 5 is a perspective view of the present invention depicting the filling thereof with a product.

FIG. 6 is a perspective view showing the package filled, sealed and ready for vending.

FIG. 7 is a perspective view showing the present invention as it appears after opening by a consumer.

DETAILED DESCRIPTION OF THE PREFERRED EMBODIMENT

Figure 8:
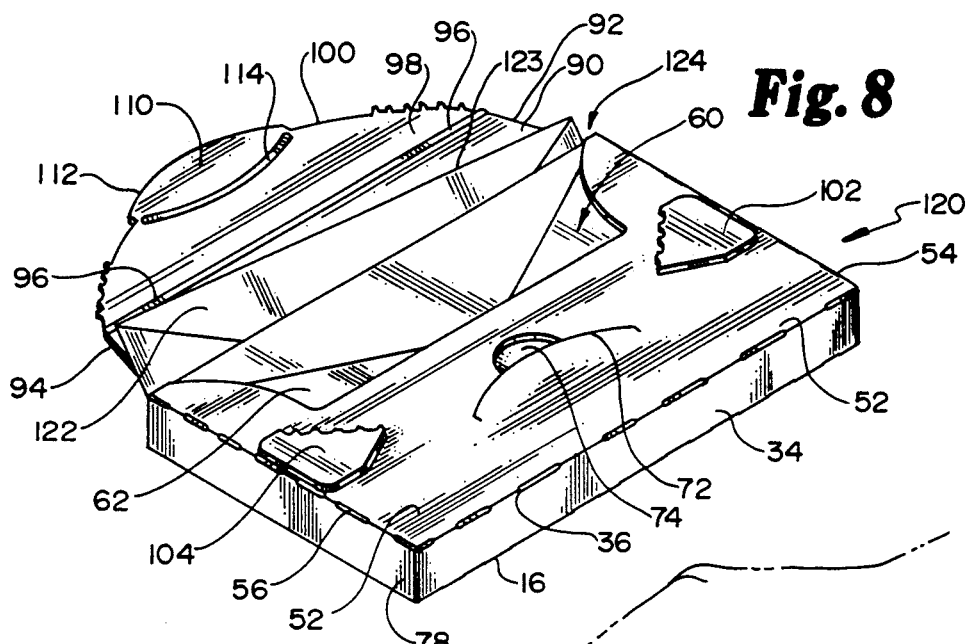
FIG. 8 is a perspective view depicting the removal of product from the package.

As shown in FIG. 1, a blank 12 in accordance with the present invention has a generally rectangular back or rear panel 14 formed and defined by two opposed, parallel pairs of perforated and scored fold lines 16, 18 and 20, 22. Two opposed inner side closure panels 24, 26 are connected to the back panel 14 at opposed, parallel fold lines 20, 22. Each side closure panel 24, 26 includes a tapered free edge 28, 30.

A generally rectangular bottom panel 34 is foldably connected to the back panel 14 at bottom back fold line 16. The bottom panel 34 is formed and defined by an additional fold line 36, opposite and parallel to fold line 16, and opposed, parallel end fold lines 38, 40. Two minor side closure panels 42, 44 are foldably connected to the bottom panel 34, one at each of fold lines 38, 40, respectively. Each of the minor side closure panels 42, 44 includes an angle-cut edge 46, 48, respectively.

A generally rectangular front panel 52 is foldably connected to the bottom panel 34 along bottom front fold line 36. The side edges of the front panel 52 are formed and defined by opposed, parallel fold lines 54, 56. At the free edge of the front panel 52 opposite fold line 36, the front panel 52 has a relieved or stripped out area (access cutout) 60. The area 60 is formed by a base cut 62, parallel to fold line 36, and two opposed shoulder cuts 64, 66 which are continuous with the base cut 62 and extend therefrom in a curve to adjacent respective fold lines 54, 56. Shoulder areas 68, 70 are adjacent the free edge of the front panel 52 between fold lines 54, 56 and cuts 64, 66.

Approximately midway between fold line 36 and base cut 62, the front panel 52 includes a generally arcuate reclosure tab slit 72. A finger receiving cut-out notch 74 is located immediately adjacent to the slit 72.

Two opposed outer side closure panels 76, 78 are foldably connected to front panel 52 along fold lines 54, 56, respectively.

With further reference to FIG. 1, the blank 12 includes a carton closure panel assembly, indicated generally at 80, foldably connected to the back panel 14 along top back fold line 18. The closure panel assembly 80 includes a top closure panel 82 formed and defined by parallel, opposed fold lines 18 and 84 and by opposed, generally parallel side edges 86, 88. A generally rectangular intermediate closure panel 90 is foldably connected to the top closure panel along top front fold line 84. The intermediate panel 90 preferably includes free side edges 92, 94 that taper inwardly toward each other as they extend away from fold line 84. The remaining edge of the intermediate panel 90 is formed by a fold score line 96 that is opposite to and parallel to fold line 84.

A sealing panel 98 is foldably connected to the intermediate panel 90 along the fold score line 96. The sealing panel 98 has a generally arcuate free edge 100 opposite to and extending between the ends of the sealing panel fold line 96. A bilateral pair of seal tabs 102, 104 is detachably connected to the sealing panel 98 along the arcuate free edge 100 adjacent the ends thereof. Each seal tab 102, 104 is connected by a perforated or incised, weakened tear line 106, 108, respectively, that coincides with the arcuate edge 100. A lozenge shaped reclosure tab or tongue 110 is located along the arcuate edge 100 generally centrally between the sealing tabs 102, 104. The outermost edge of the tongue 110 is formed by an arcuate free edge 112 that has essentially the same curvature or arc as the arcuate free edge 100 of the sealing flap 98. A reversely curved fold score line 114 forms the edge of the tongue 110 innermost relative to the sealing panel 98. Each seal tab 102, 104 includes an adhesive area 116. Although the free edge 100 is generally arcuate, it may be straight or may include angular, straight, or both straight and curved portions, as long as the tabs 102, 104 and the tongue 110 may be connected to the sealing panel 98 along the free edge 100.

Referring to FIG. 6, the finished and filled pack or carton 120 made from the blank 12 is depicted. FIGS. 2-5 depict a sequence of assembly or erection of the carton 120. Specifically, with reference to FIG. 2, to form the carton 120, the blank 12 is first folded 180° about fold line 16 so that the front panel 52 and the bottom panel 34 overlie the remainder of the blank 12, including the back panel 14. As depicted in FIG. 3, portions of the closure panel assembly 80, including intermediate panel 90 and sealing panel 98, are then folded 180° about the fold line 84 so that the carton closure panel assembly 80 generally overlies the front panel 52. It should be appreciated that adhesive may be applied to the sealing tabs 102, 104 just prior to the fold depicted in FIG. 3. Alternatively, just after the fold, adhesive previously applied may be heat or chemically activated. In either event, the sealing tabs 102, 104 are affixed to the front panel 52 in the areas adjacent the ends of base cut 62.

FIGS. 4 and 5 depict the filling of the partially erected carton 120. The side closure panels 26, 44, 78 (left set) and 24, 42, 76 (right set) are left open as depicted in FIG. 4 for receiving product 122. After the product is slidably inserted into the carton 120, as suggested in FIG. 5, the panels of both of the sets of the side closure panels may be folded inwardly to overlie one another and be fixed in place. Taking the left set as an example, panel 44 is folded in first, followed by inner side closure panel 26, then by outer side closure panel 78. At this point the container 120 has assumed the configuration substantially as depicted in FIG. 6. Any of the side closure panels brought into overlying, contacting relationship may be secured by various suitable adhesives or by frictional interlocks such as slotted locking tabs (not shown). The final closed and sealed film pack carton 120 forms a neat, relatively rigid rectangular carton of uniform dimensions.

With reference to FIGS. 7-10, a consumers's use of the carton 120 is depicted. FIG. 7, and specifically arrow A, depict the opening of the carton closure panel assembly 80. A lifting force exerted on the assembly 80, and specifically the tongue 110, in the direction of arrow A will lift first the arcuate edge 100 of sealing panel 98, separating that panel 98 from the front panel 52 by tearing along the incised tear lines 106, 108 connecting the tabs 102, 104 to the sealing panel 98. The assembly 80 may be lifted and unfolded further outwardly along arrow A about fold line 18 until the carton 120 is open to the desired degree, usually wherein the carton closure panel assembly 80 will be generally coplanar with the back panel 14 (FIG. 8). Following the tearing of the tear lines 106, 108, the sealing tabs 102, 104 will remain adhered to the front panel 52 as depicted in FIG. 8.

One of the advantages of the present invention, easy access to the contents 122, is made evident in FIG. 8. The access cutout area 60 in the front wall 52 provides visibility of the contents 122 as well as easy grasping of the upper edge 123 thereof. Additionally, because the top opening 124 of the opened carton 120 and, in particular, the upper top edges of the closure flaps 24, 26, 76, 78, have no minor flaps attached thereto, the contents 122 may be removed without interference from the package 120.

Figure 9:
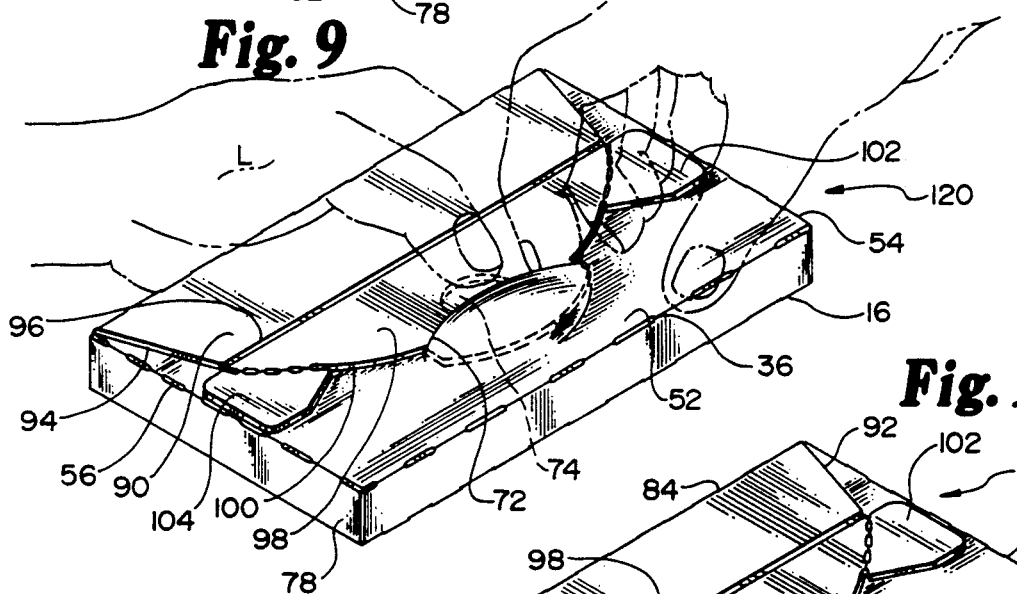
FIG. 9 is a perspective view depicting the package of the present invention being reclosed.
Figure 10:
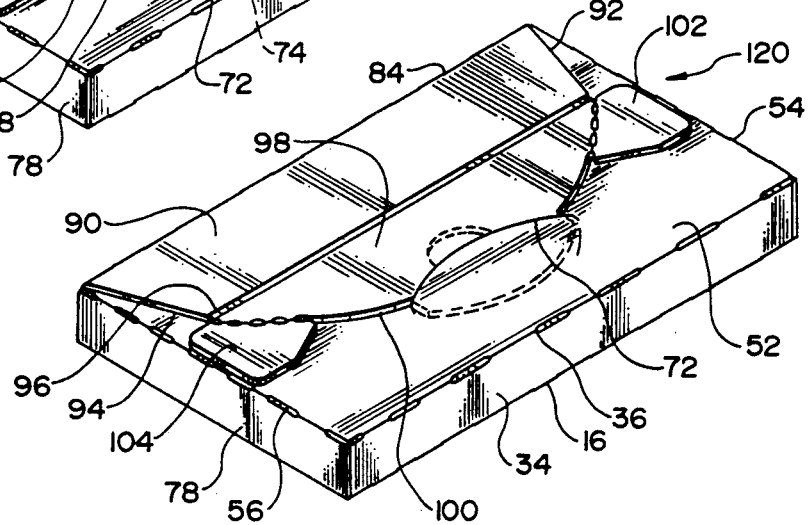
FIG. 10 is a perspective view of a reclosed and locked package.

FIG. 9 depicts the resealing or reclosing of the carton 120. A consumer grips the arcuate slit 72 by means of finger notch 74 to deflect a portion of the front panel 52 adjacent the slit 72 out of the plane of the remainder of the front panel 52. With the left hand L, the top closure assembly 80 may be bent into a slightly arcuate or arched configuration along the seal panel fold line 96. Additionally, the tongue 110 may be bent inwardly toward the carton interior along the arcuate line 114. With the front panel deflected slightly outwardly in the area of the slit 72, the tongue 110 may be slid easily into the slit 72. The natural resiliency of the material from which the carton 120 is made and friction between the tongue 110 and front wall panel 52 lock the tongue 110 in place behind the portion of the front wall 52 adjacent the lower and inner side of the arcuate slit 72. Thus, the slit 72 acts as tongue receiving means or reclosing means for releasably receiving and holding the tongue 110 upon reclosure.

A number of variations of the present invention can be made. For example, cartons may be of various sizes to provide a container for various size photographic prints or other generally flat, thin articles such as sheet music or envelopes. While the carton 120 is suitably formed in a rectangular shape, other container shapes such as square or polygonal could be used and adapted for the mechanical dispensing of various products. The paperboard from which the present invention may be fabricated may be of any suitable composition as long as it is sufficiently rigid or stiff to adequately protect the contents. One example of suitable paperboard is a 16 point solid bleached sulfite paperboard. The selected paperboard may be coated or impregnated with appropriate substances to provide characteristics such as resistance to liquids. Other methods than those depicted might be used to seal the carton 120 into condition for dispensing as depicted in FIG. 6; such other methods might include various adhesives or systems of interlocking tabs. Both the interior and the exterior of the completed package may be marked with indicia or advertising as appropriate.

The carton or package 120 is sold to the consumer in the fully filled and closed state depicted in FIG. 6, but the producer usually provides the blank 12 in a completely flat, unerected condition as shown in FIG. 1. Alternatively, the carton 120 may be provided to a purchaser in the partially erected, but flattened condition depicted in FIG. 3, whereby the purchaser of the carton 120 may erect it into the generally tubular shape depicted in FIG. 4 and fill the carton 120 with product 122.

The present invention may be embodied in other specific forms without departing from the essential spirit or attributes thereof. It is therefore desired that the described embodiment may be considered in all respects as illustrative, not restrictive, reference being made to the appended claims rather than to the foregoing description to indicate the scope of the invention.

What is claimed is:

1. A carton for receiving and holding a stack of flat articles comprising:
   a generally rectangular back panel having a pair of opposed, substantially parallel side edges and a side closure panel attached at each of the side edges;
   a generally rectangular bottom panel having a pair of opposed, substantially parallel side edges and a side closure panel attached at each of the side edges, said front panel being connected to the bottom panel at a bottom front fold line that is substantially perpendicular to the side edges of the front panel;
   a generally rectangular front panel having a pair of opposed, substantially parallel side edges and a side closure panel attached at each of the side edges, said front panel being connected to the bottom panel at a bottom front fold line that is substantially perpendicular to the side edges of the front panel, said front panel having an access cutout extending inwardly from the edge of the front panel opposite the bottom front fold line toward the bottom front fold line; and
   a carton closure panel hingedly connected to the back panel, said carton closure panel comprising:
   a generally rectangular top closure panel hingedly connected to the back panel at a top back fold line that is parallel to the bottom back fold line;
   a generally rectangular intermediate closure panel hingedly connected to the top closure panel at a top front fold line that is parallel to the top back fold line; and
   a sealing panel connected to the intermediate closure panel at a sealing panel fold line that is parallel to the top front fold line, said sealing panel having a free edge opposite the sealing panel fold line and a pair of seal tabs, one of said seal tabs being detachably connected adjacent each of the ends of the free edge and being affixed to the front panel generally in the area between the access cutout and the bottom front fold line.

2. A carton as recited in claim 1 wherein the seal panel further has a reclosure tab extending from the free edge intermediate the two seal tabs and the front panel has a reclosure tab slit intermediate the side edges of the front panel for receiving the reclosure tab.

3. A carton as recited in claim 2, wherein said free edge is arcuate.

4. A carton as recited in claim 2, wherein said reclosure tab is foldably coupled to said free edge of said sealing panel.

5. A closure for a carton having an interior and an opening into said interior, said closure comprising a closure panel assembly including:
   a top closure panel having a periphery substantially conforming to said opening and foldably connected to said carton along a portion of said periphery;
   an intermediate closure panel foldably connected to said top closure panel generally at a location opposite the connection between said carton and said first closure panel;
   a seal panel foldably connected to said intermediate panel generally at a location opposite the connection between said intermediate panel and said top closure panel, said seal panel having a curved free edge with two opposed ends, said free edge generally opposite the connection between said intermediate panel and said seal panel;
   a reclosing tongue extending from said curved free edge approximately midway between said ends of said free edge; and
   a pair of sealing tabs removably connected to said seal panel and extending from said curved free edge, one of said sealing tabs being adjacent each of the ends of said curved free edge and spaced from said tongue, and said sealing tabs being affixed to said carton whereby said intermediate closure panel and said seal panel closely overlie said carton.

6. The closure according to claim 5, wherein said carton is reclosable and said closure panel assembly further comprises a reclosing tongue extending from said curved free edge approximately midway between said sealing tabs and reclosing means operably coupled to said carton for receiving said reclosing tongue.

7. The closure according to claim 6, wherein each of said sealing tabs is removably connected to said seal panel at a curved line of weakness extending across the connection between said seal panel and said sealing tabs.

8. The closure according to claim 7, wherein each of said lines of weakness comprises a curved line of perforations having substantially the same arc as said curved free edge.

9. A flat blank for forming a reclosable carton for receiving and holding a stack of flat articles such as photographic prints comprising:
   a generally rectangular back panel having a pair of opposed, substantially parallel side edges and a side closure panel hingedly attached at each of said side edges;
   a generally rectangular bottom panel having a pair of opposed, substantially parallel side edges and a side closure panel hingedly attached at each side edge, said bottom panel hingedly connected to said back panel at a bottom back fold line that is substantially perpendicular to the side edges of said bottom panel;
   a generally rectangular front panel having a pair of opposed, substantially parallel side edges and a side closure panel hingedly attached at each of the side edges, said front panel hingedly connected to said bottom panel at a bottom front fold line that is substantially perpendicular to the side edges of the front panel, said front panel having a stripped out area extending inwardly from the edge of the edge of the front panel opposite the bottom front fold line toward the bottom front fold line; and
   a carton closure panel hingedly connected to the back panel, said carton closure panel comprising:
      a generally rectangular top closure panel hingedly connected to the back panel at a top back fold line that is parallel to the bottom back fold line;
      a generally rectangular intermediate closure panel hingedly connected to the top closure panel at a top front fold line that is parallel to the top back fold line; and
      a seal panel hingedly connected to the intermediate closure panel at a seal panel fold line that is parallel to the top front fold line, said seal panel having a free edge opposite the seal panel fold line and seal tab means, said seal tab means being detachably connected at each of the ends of the free edge, said seal tab means for affixation to said front panel generally in the area between the access cutout and the bottom front fold line.

10. The blank according to claim 7, wherein said seal free edge is generally arcuate and the panel includes a reclosure tab extending from the arcuate free edge intermediate the seal tab means and the front panel includes a reclosure tab slit intermediate the side edges of the front panel for receiving the reclosure tab.

* * * * *

UNITED STATES PATENT AND TRADEMARK OFFICE
CERTIFICATE OF CORRECTION

PATENT NO. : 5,123,589

DATED : June 23, 1992

INVENTOR(S) : Raymond A. Cote

It is certified that error appears in the above-identified patent and that said Letters Patent is hereby corrected as shown below:

Column 6, claim 1, lines 30-32 should read as follows:

said bottom panel being connected to the
    back panel at a bottom back fold line that
    is substantially perpendicular to the
    side edges of the bottom panel;

Signed and Sealed this

Twenty-fourth Day of August, 1993

Attest:

BRUCE LEHMAN

Attesting Officer     Commissioner of Patents and Trademarks